US009145827B2

(12) United States Patent
Lueddecke et al.

(10) Patent No.: US 9,145,827 B2
(45) Date of Patent: Sep. 29, 2015

(54) BLEED VALVE OF AN EXHAUST GAS TURBOCHARGER

(71) Applicants: IHI CHARGING SYSTEMS INTERNATIONAL GMBH, Heidelberg (DE); AUDI AG, Ingolstadt (DE)

(72) Inventors: Bernhardt Lueddecke, Grossniedesheim (DE); Hermann Burmester, Heidelberg (DE); Jan Ehrhard, Wiesloch (DE); Dietmar Filsinger, Wiesloch (DE); Nobuguki Ikeya, Yokohama (JP); Christian Winter, Schoenau (DE); Achim-Hans Hinkelmann, Ingolstadt (DE)

(73) Assignee: IHi CHARGING SYSTEMS INTERNATIONAL GMBH, Heidelberg (DE)

( * ) Notice: Subject to any disclaimer, the term of this patent is extended or adjusted under 35 U.S.C. 154(b) by 66 days.

(21) Appl. No.: 13/952,631

(22) Filed: Jul. 28, 2013

(65) Prior Publication Data
US 2013/0305711 A1 Nov. 21, 2013

Related U.S. Application Data

(63) Continuation-in-part of application No. PCT/EP2012/000572, filed on Feb. 8, 2012.

(30) Foreign Application Priority Data

Feb. 11, 2011 (DE) .................. 10 2011 011 003

(51) Int. Cl.
*F02D 23/00* (2006.01)
*F02B 33/44* (2006.01)
*F02B 47/08* (2006.01)
*F02B 37/18* (2006.01)

(52) U.S. Cl.
CPC .............. *F02B 47/08* (2013.01); *F02B 37/186* (2013.01); *F05D 2220/40* (2013.01); *F05D 2250/70* (2013.01); *F05D 2250/75* (2013.01); *F05D 2260/606* (2013.01); *F05D 2260/96* (2013.01); *Y02T 10/144* (2013.01)

(58) Field of Classification Search
CPC .... F02B 37/186; F02B 47/08; F05D 2220/40; F05D 2250/70; F05D 2250/75; F05D 2260/606; F05D 2260/96; Y02T 10/144
USPC .............. 60/602, 305.1; 251/149.2, 301
See application file for complete search history.

(56) References Cited

FOREIGN PATENT DOCUMENTS

| DE | 103 44 815 | 4/2004 | |
| DE | 20 2010 005 747 | 2/2010 | |
| DE | 202010005747 U1 * | 7/2010 | ............... F16K 1/48 |
| WO | WO 2010/036532 | 1/2010 | |
| WO | WO 2010039596 A2 * | 4/2010 | ............. F02B 37/12 |

* cited by examiner

Primary Examiner — Audrey K Bradley
(74) Attorney, Agent, or Firm — Klaus J. Bach

(57) ABSTRACT

In an exhaust gas charger bleed valve with a valve disk by which the flow cross-section of a bypass duct, via which exhaust gas flow volume bypassing an impeller of the exhaust gas turbocharger is adjustable, the valve includes a valve disk with the exhaust gas turbocharger is adjustable, the valve includes a valve disk with a front end valve face which is formed so as to be asymmetric with respect to the valve disk attachment to a lever arm on which the valve disk is mounted.

2 Claims, 5 Drawing Sheets

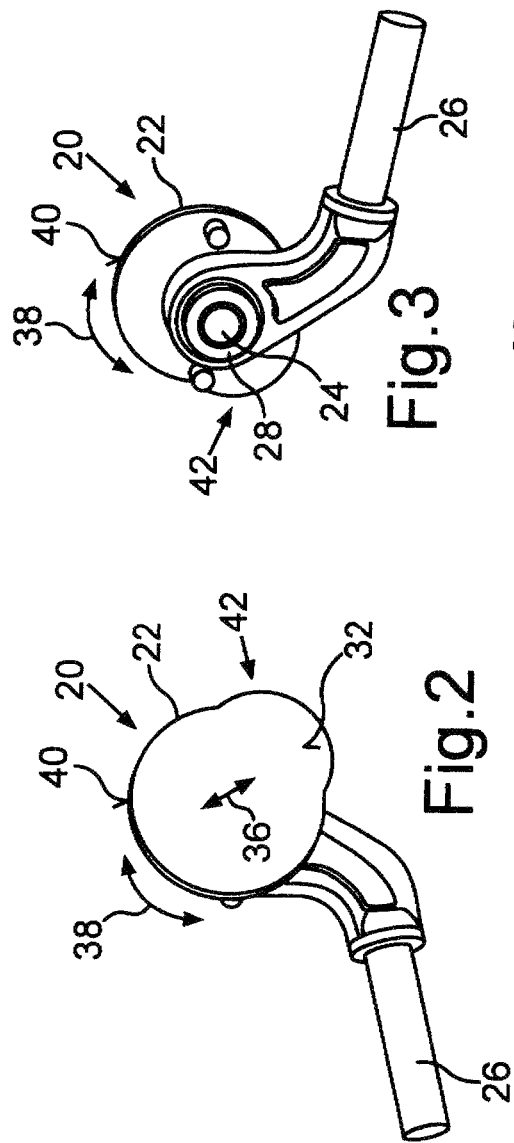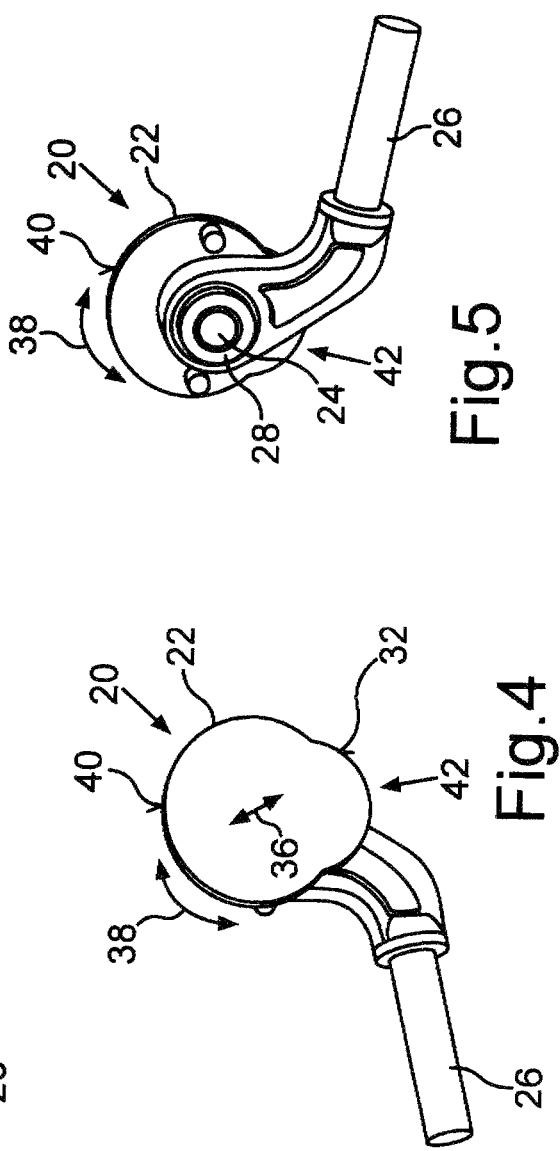

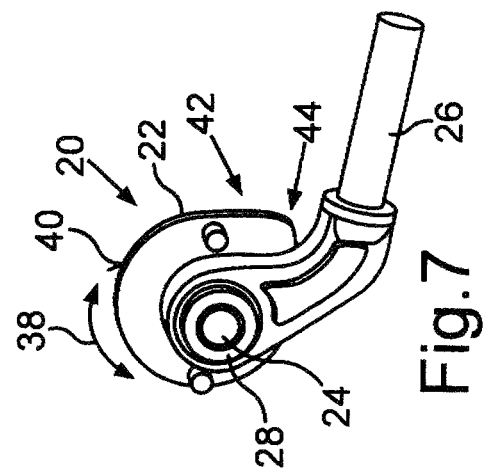
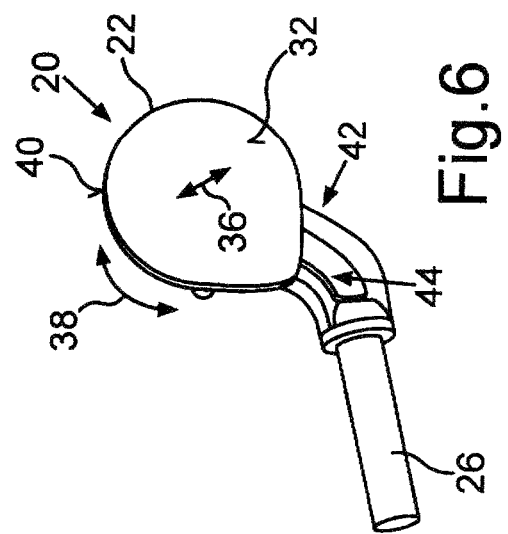

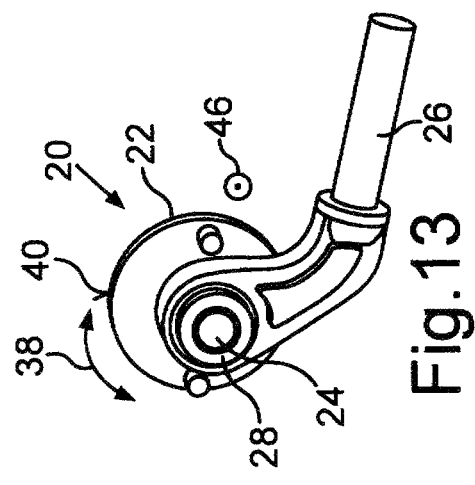
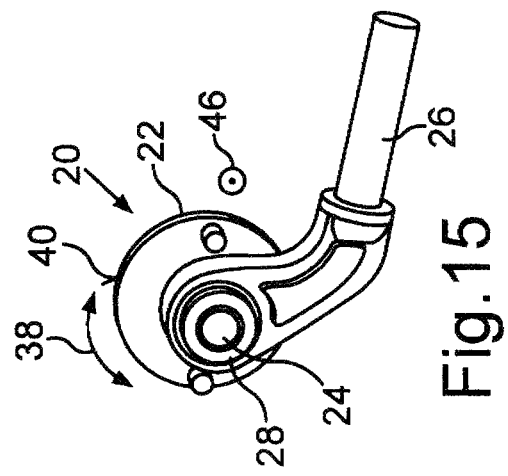
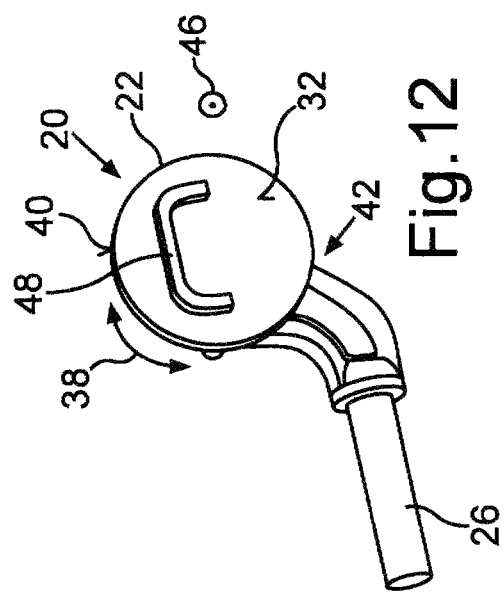
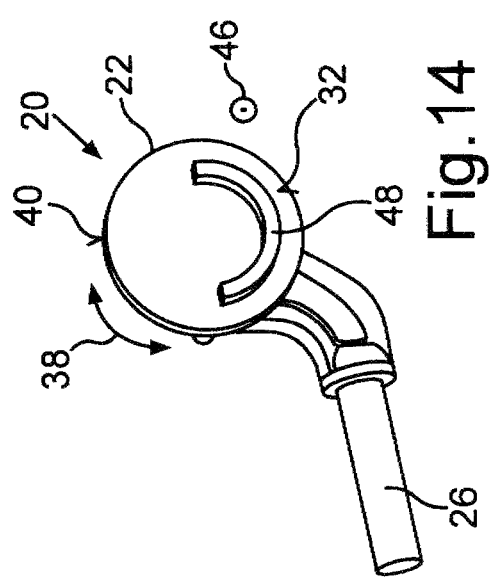

BLEED VALVE OF AN EXHAUST GAS TURBOCHARGER

This is a Continuation-In-Part application of pending International patent application PCT/EP2012/000572 filed Feb. 8, 2012 and claiming the priority of German patent application 10 2011 011 003.8 filed Feb. 11, 2011.

BACKGROUND OF THE INVENTION

The invention relates to a bleed valve of an exhaust gas turbocharger with a valve disc by which the flow cross-section of a bypass duct of the turbocharger is adjustable.

DE 20 2010 005 747 U1 discloses a bleed valve of an exhaust gas turbocharger with a valve disk and a pivot arm on which the valve disk is secured. The valve disk is secured to the swivel arm in such a manner that the valve disk has some play relative to the swivel arm, in particular, that it is capable of a tilting motion relative to the swivel arm.

It has been found that this play is the cause of an audible and unpleasant noise during the operation of the turbocharger. The passengers of an automobile with a turbocharger including this valve flap become aware of this noise as rattling and/or crackling noise. The mentioned play is, however, necessary for angular compensation and/or, in particular, for compensating manufacturing and/or component-related tolerances.

It is therefore the object of the present invention, to further develop a bleed valve of an exhaust gas turbocharger of the initially mentioned type, so that the valve has an improved noise behavior.

SUMMARY OF THE INVENTION

In an exhaust gas charger bleed valve with a valve disk by which the flow cross-section of a bypass duct, via which exhaust gas flow volume bypassing an impeller of the exhaust gas turbocharger is adjustable, the valve includes a valve disk with the exhaust gas turbocharger is adjustable, the valve includes a valve disk with a front end valve face which is formed so as to be asymmetric with respect to the valve disk attachment to a lever arm on which the valve disk is mounted.

It has been found that such valves, in particular in an open position that is when the bypass duct is at least partially open, the mentioned noise is generated by exhaust gas flow through the valve. This noise is in particular due to a movement of the valve disk which contacts the valve seat generating the rattling and/or crackling noises. The valve seat is formed corresponding to the valve disk or the valve face, respectively, with the valve seat normally being arranged in a turbine casing of the exhaust gas turbocharger. The movement is in particular caused by an aerodynamic interaction of the valve disk and the gas flowing through the bypass duct. In particular, high pressure pulsations and/or high volume or mass flow pulsations of the gas which hits the valve disk at least partially and/or flows around it, play an important role and greatly influence the undesired noise which, may become audible in the interior of a passenger car.

The noise may further be caused by a moment acting on the valve disk, which changes its direction during the operation of the exhaust gas turbocharger. This means that a positive and negative moment acting on the valve disk are successively alternating during the operation of the exhaust gas turbocharger and may cause the rattling and/or crackling noise of the valve disk or the bleed valve, respectively, with the moment acting about an axis of rotation of the valve means. This moment is, in turn, caused by aerodynamic forces which change during the operation of the exhaust gas turbocharger, in particular during work cycles of a combustion engine associated with the exhaust gas turbocharger as the points of attack of the moment acting on the valve disk or the valve means, respectively, are also changing with the changing aerodynamic forces.

In addition, it was found that the movement and the noise caused thereby may be enhanced by a self-excitation of the valve and in particular of the valve disk if no adequate countermeasures are taken.

In order to reduce or prevent undesired noise which, in particular is due to self-excitation, the outer geometry of the valve means and in particular of the valve disk is designed in such a manner that self-excitation is prevented or shifted to an excitation frequency range in which the noise is not audible for the human ear. The inventive valve means is therefore provided with an asymmetrically formed valve face of the valve disk. The geometric design of the valve disk of the inventive valve is such that it results in an asymmetric build-up of the described moment which acts on the valve disk during operation of the combustion engine. This means that the above-mentioned prior art alternation of the direction of the moment acting on the valve disk is avoided. This reduces or prevents the generation of the described unpleasant noise, which improves the driving comfort for the passengers. The described adequate geometric design also prevents the valve disk from being distorted on the corresponding valve seat.

The bypass duct, which is also referred to as a wastegate or a bleed duct, is opened, in particular, by the valve disk in the high speed and/or high load ranges, so that at least part of the exhaust gas of the combustion engine may bypass the impeller, in particular a turbine wheel of a turbine of the exhaust gas turbocharger. This exhaust gas does therefore not drive the turbine wheel. Opening of the bypass duct in high speed and/or high load ranges is provided for realizing a high flow parameter e. g. of the turbine, as well as a wide flow parameter spreading of the turbine in these high speed and/or high load ranges, so that it may be efficiently operated both in the high speed and/or high load ranges, in particular, in full-load ranges, and, on the other hand, in the low speed and/or low load ranges. This enables low fuel consumption of the combustion engine, which again brings about low $CO_2$ emission.

In the high speed and/or high load ranges, it may happen that the described noise is drowned out by the noise generated by the combustion engine, so that the noise of the valve disk of conventional valve means is not audible. But even in these high speed and/or high load ranges, there may be operating conditions of the combustion engine, in which the noise is audible when conventional valves are used.

For realizing particularly low fuel consumption, the bypass duct may also be opened in comparatively lower speed and/or load ranges in which the noise which is generated by conventional valves is not drowned out by the combustion engine's noise and is therefore distinctly audible for the passengers.

Thus, the inventive valve does not only prevent or reduce the noise in the high speed and/or high load ranges, in particular in the full-load range of the combustion engine, but also in the low speed and/or low load ranges in which the noise would be distinctly perceivable in the interior of the automobile as rattling, crackling or clattering noise. Therefore, the inventive valve provides for a particularly high driving comfort for the passengers of the automobile, in particular of a passenger car. Moreover, the inventive valve is advantageous in that the reduction or prevention of noise is realized in a particularly cost effective way, which keeps the total costs of the exhaust gas turbocharger low.

It was found that a connection point where the valve is connected to an actuating part, in particular a pivot arm, for actuating the valve disk, may influence the generation of noise. This inventive valve, however, reduces or prevents this potential cause of the noise, too, so that the inventive valve exhibits improved noise behavior.

In a particularly advantageous embodiment of the invention the valve face is formed point-asymmetric. This prevents or shifts self-excitation particularly efficiently into frequency ranges in which the noise is not audible.

It is also particularly advantageous to form the valve face axis-asymmetric for preventing the generation of noise or to transfer it into a non-audible frequency range.

In a particularly advantageous embodiment of the invention, the valve disk is formed at least essentially by an at least essentially disk-shaped asymmetric base body. An initially symmetric base body which constitutes the valve disk is, for example in this embodiment of the invention, modified to an asymmetric design, so that generation of noise in particular due to self-excitation is prevented, or the noise or self-excitation, respectively, is transferred into frequency ranges in which the noise cannot be heard by the human ear.

The valve disk or the valve face, respectively, preferably comprises at least one projection and/or recess which extend at least essentially in the radial direction. Assuming an e. g. at least essentially circular valve face of the valve disk, it means, that this at least essentially circular valve face is provided with the at least one projection and/or the at least one recess in order to form the valve face or the valve disk, respectively, asymmetric, in particular point-asymmetric and/or axis-asymmetric. This allows a highly efficient and cost effective prevention or reduction of the unpleasant noise or its transfer into frequency ranges in which they are not perceivable by the human ear.

In another advantageous embodiment of the invention, the valve face or the valve disk, respectively, comprises a projection and/or recess which extends at least essentially in the axial direction. This means that, for example, the valve face or the corresponding valve disk, respectively, which is at least essentially circular in the circumferential direction relative to the radial direction is provided with the at least one projection and/or recess, which extend at least essentially in the axial direction and thus at least essentially perpendicular to the radial direction. This allows preventing or reducing the unpleasant noise or shifting it into frequency ranges in which it is not perceivable by the human ear in a particularly cost effective and advantageous manner.

Preferably, the projection and/or the recess are formed arc-shaped at least in portions. This allows keeping the manufacturing costs low for the inventive valve, which contributes to low total costs for the exhaust gas turbocharger. In addition, the arc-shaped configuration avoids abrupt and sharp-edged transitions between at least two lengths and notch effects as well as high loads of the inventive valve. Thereby, the inventive valve also exhibits a particularly high functional reliability, even over a long life.

Further advantages, features and details of the invention will become more readily apparent from the following description of preferred exemplary embodiments thereof with reference to the accompanying drawings. The features and feature combinations as previously mentioned in the description as well as the features and feature combinations which will be mentioned in the following description of the figures and/or which are solely illustrated in the figures are not only applicable in the respective indicated combination but also in other combinations or isolated, without departing from the scope of the invention. In the figures:

BRIEF DESCRIPTION OF THE DRAWINGS

FIG. 2 is a schematic and perspective front view of an exemplary embodiment of the valve of the turbine according to FIG. 1, FIG. 3 is a schematic and perspective rear view of the valve according to FIG. 2, FIG. 4 is a schematic and perspective front view of another exemplary embodiment of the valve according to FIGS. 2 and 3, FIG. 5 is a schematic and perspective rear view of the valve according to FIG. 4, FIG. 6 is a schematic and perspective front view of an alternative exemplary embodiment of the valve according to FIGS. 2 to 5, FIG. 7 is a schematic and perspective rear view of the valve according to FIG. 6, FIG. 12 is a schematic and perspective front view of another exemplary embodiment of the valve according to FIGS. 2 to 11, FIG. 13 is a schematic and perspective rear view of the valve according to FIG. 12, FIG. 14 is a schematic and perspective front view of another exemplary embodiment of the valve according to FIGS. 2 to 13, and FIG. 15 is a schematic and perspective rear view of another exemplary embodiment of the valve according to FIG. 14.

DESCRIPTION OF EXEMPLARY EMBODIMENTS

Figure 1:
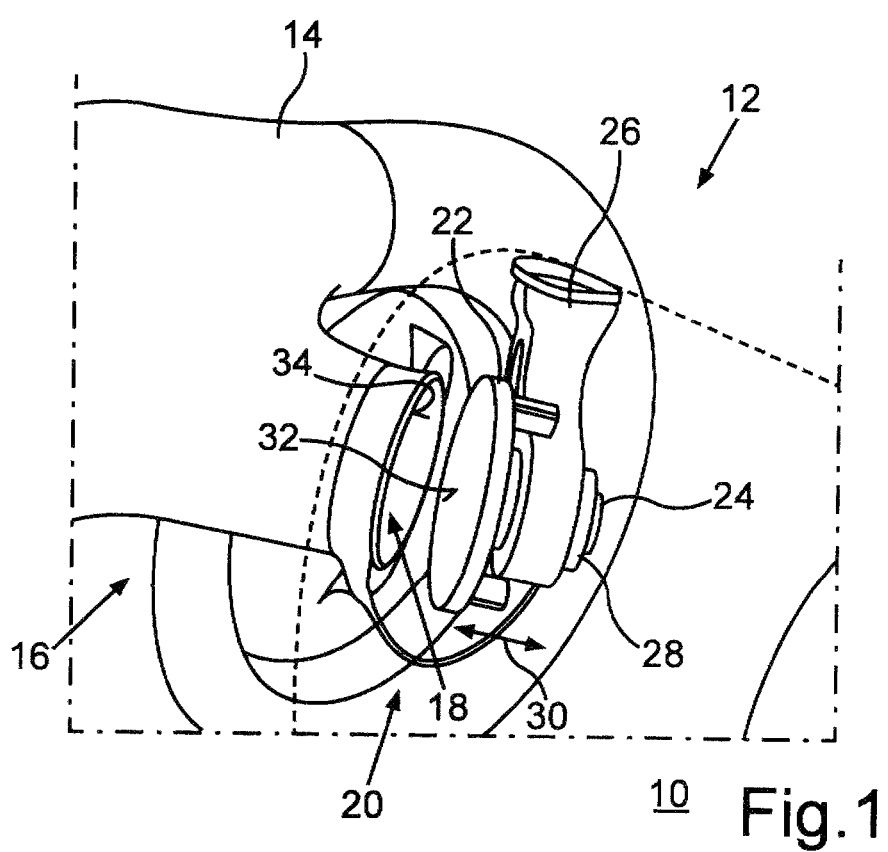
FIG. 1 is a schematic and partially perspective sectional view of an exhaust gas turbocharger for a combustion engine with a turbine provided with an inventive valve according to the invention.

FIG. 1 shows an exhaust gas turbocharger 10 for a combustion engine (not shown in detail) which is e. g. a reciprocating internal combustion engine. The combustion engine is chargeable by means of the exhaust gas turbocharger 10. The exhaust gas turbocharger 10 comprises a compressor (not shown in detail) with a compressor casing (not shown in detail) in which a compressor wheel (not shown in detail) is arranged rotatably about an axis of rotation (not shown in detail). The air to be supplied to the combustion engine is compressible by means of the compressor so that the combustion engine may be operated particularly efficiently at low fuel consumption, which goes along with low $CO_2$ emission.

For driving the compressor, the exhaust gas turbocharger 10 comprises a turbine 12 with a turbine casing 14, in which a turbine wheel (not shown in detail) is arranged rotatably about an axis of rotation (not shown in detail). The axis of rotation about which the turbine wheel may rotate is the same axis of rotation or an axis of rotation, respectively, which is arranged coaxially with the axis of rotation, about which the compressor wheel may rotate. The turbine wheel and the compressor wheel each are connected for rotation with a shaft (not shown in detail) of the exhaust gas turbocharger 10. The turbine casing 14 comprises at least one exhaust gas duct which is, for example, formed as a spiral duct by way of which exhaust gas of the combustion engine may be supplied to the exhaust gas turbocharger 10 or the turbine wheel, respectively. Thus, the exhaust gas hits and thereby drives the turbine wheel so that the compressor wheel may be driven via the shaft by the turbine wheel in order to compress the air.

For controlling the charging pressure provided by the exhaust gas turbocharger 10 and/or for realizing a particularly high flow parameter of the turbine 12, i. e. enabling a particularly large quantity or mass flow, respectively, of exhaust gas through the turbine 12, the turbine 12 comprises a bypass means 16 with a bypass duct 18. On the one hand, the bypass duct 18 opens upstream of the turbine wheel in the flow direction of the exhaust gas through the turbine 12 into an exhaust gas duct for supplying the exhaust gas to the turbine wheel. On the other hand, the bypass duct 18 opens downstream of the turbine wheel into a turbine wheel outlet region (not shown in detail). This allows to tap off exhaust gas upstream of the turbine wheel and to conduct it downstream to an exhaust duct, while bypassing the turbine wheel. This tapped-off exhaust gas does not drive the turbine wheel. Bypassing the turbine wheel is also referred to as bleeding, which is why the bypass means 16 is also referred to as a bleed means.

In order to appropriately set and execute this bypass procedure, the bypass means 16 comprises a valve 20 with a valve disk 22 which is provided with a valve head 24 formed integrally with the valve disc 22. The valve 20 is connected via the valve head 24 to a pivot arm 26 of an actuating structure (not shown in detail) for the valve 20, so that the valve disc 22 may be moved via the pivot arm 26 between at least two positions. In one of these positions which is e. g. shown in FIG. 1, the valve 20 opens the bypass duct 18 so that exhaust gas may flow through the bypass duct 18 and thus bypass the turbine wheel.

In the at least one other position of the valve 20 the bypass duct 18 is at least essentially fluidly blocked by the valve 20 and in particular by the valve disk 22 so that the exhaust gas cannot flow through the bypass duct 18 and the at least essentially total exhaust gas volume hits and drives the turbine wheel. Of course, it may be provided that the valve means 20 is adjustable continuously or in steps between a plurality of positions to adjust a quantity or the mass flow, respectively, of the exhaust gas through the bypass duct 18 as required and variably. In other words, the valve means 20 allows the adjustment of the flow cross-section of the bypass duct 18 and to open the bypass duct 18 at least partially fluidly or to block it at least partially fluidly.

For connecting the valve 20 to the pivot arm 26, a valve ring 28 is provided by means of which the valve 20 is held on the pivot arm 26. The connection or mounting, respectively, of the valve 20 to, or on, the pivot arm 26 has some play so that in particular manufacturing and/or assembly-related tolerances may be compensated. Further, this play-related mounting allows for an angular compensation in order to ensure the desired function of the valve means 20.

For fluidly blocking the bypass duct 18, the valve disk 22 has a front end valve face 32 relative to the axial direction of the valve 20 by a directional arrow 30. The turbine casing 14 provides a valve seat 34 corresponding to the valve face 32, against which the valve face 32 abuts for fluidly blocking the bypass duct 18 or on which the valve face 32 or the valve disk 22, respectively, is seated.

In order to avoid undesired noise, e. g. rattling, crackling, rustling and/or the like, which may result from the play-related mounting of the valve means 20 to the lever arm 26 and due to a successive contact and non-contact of the valve face 32 on the valve seat 34, the valve face 32 is formed, at least essentially, asymmetric as will be explained in the following with reference to FIGS. 2 to 15.

Through this asymmetric design, in particular noise generation due to self-excitation of the valve 20 during operation of the combustion engine is prevented or reduced, or the noise is generated in the frequency range of self-excitation or is transferred, respectively, into a frequency range in which the noise is not perceivable by the human ear.

FIGS. 2 and 3 show a possible exemplary embodiment of the valve 20 which is secured on the lever arm 26. As can be seen in FIGS. 2 and 3, the valve disk 22 is modified from an at least essentially circular disk-shaped cylinder relative to the radial direction (directional arrow 36) in the circumferential direction (directional arrow 38) and formed asymmetrically, so that the valve face 32 is asymmetric. Relative to the base body which is at least essentially circular in the circumferential direction (directional arrow 38), the valve face 32 or the outer contour 40, respectively, of the valve face 32 comprises an arc-shaped projection 42 which extends in the essentially radial direction (directional arrow 36). The mentioned unpleasant noise which may be audible in the interior of an automobile, in particular a passenger car which is provided with the combustion engine and the exhaust gas turbocharger 10 according to FIG. 1, is reduced, prevented and not perceivable by the human ear.

FIGS. 4 and 5 show an alternative exemplary embodiment of the valve 20 with the valve disk 22 and the valve face 32. Similar to the valve disk 22 according to FIGS. 2 and 3 and the valve face 32 according to FIGS. 2 and 3 and the valve face 32, the valve disk 22 according to FIGS. 4 and 5 are formed point-asymmetric and thus asymmetric, so that noise is prevented, reduced or at least not perceivable. In contrast to the valve means 20 according to FIGS. 2 and 3, the projection 42 has a different orientation relative to the lever arm 26. In addition, the projection 42 is somewhat narrower in the circumferential direction (directional arrow 38).

FIGS. 6 and 7 show another alternative exemplary embodiment of the valve means 20, wherein the projection 42 is still narrower in the circumferential direction (directional arrow 38) than the projections 42 according to FIGS. 2 to 5 and thus has a more distinctly pointed tip 44. In addition, the projection 42 has an orientation relative to the lever arm 26 different from that of the valve means 20 according to FIGS. 2 to 5.

Figure 8:
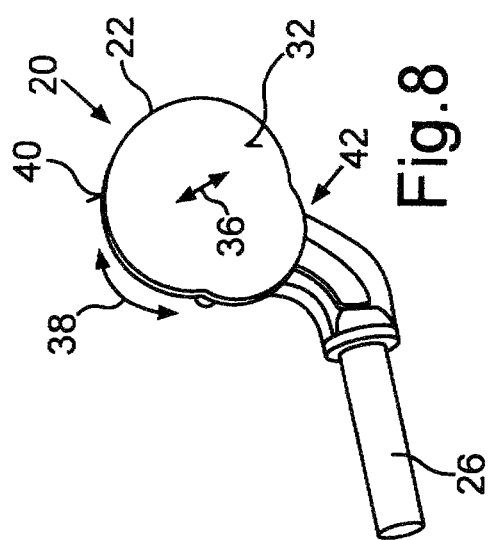
FIG. 8 is a schematic and perspective front view of another exemplary embodiment of the valve according to FIGS. 2 to 7.
Figure 9:
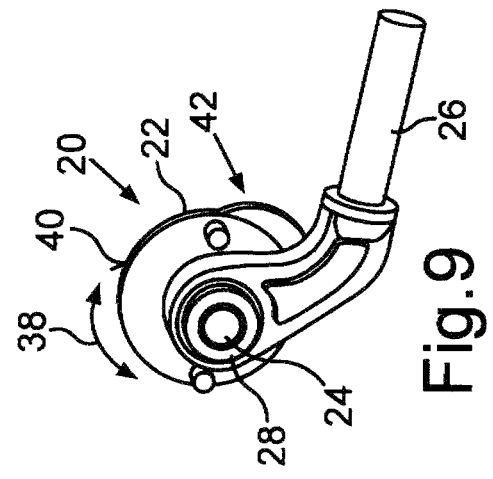
FIG. 9 is a schematic and perspective rear view of the valve according to FIG. 8.

FIGS. 8 and 9 show another exemplary embodiment of the valve means 20, wherein the projection 42 in contrast to the projection 42 according to FIGS. 6 and 7 is a wider in the circumferential direction and also has a different orientation relative to the lever arm 26.

Figure 10:
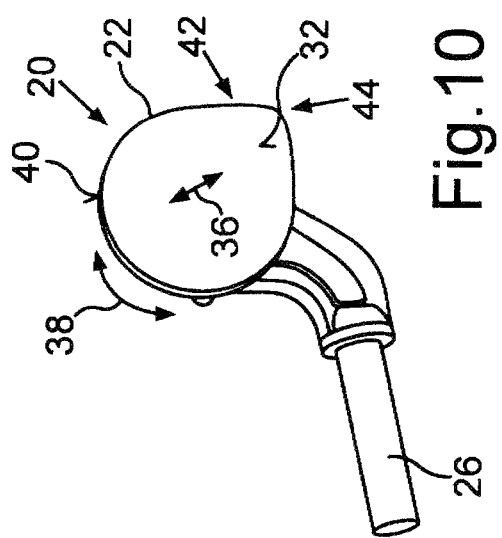
FIG. 10 is a schematic and perspective front view of another exemplary embodiment of the valve according to FIGS. 2 to 9.
Figure 11:
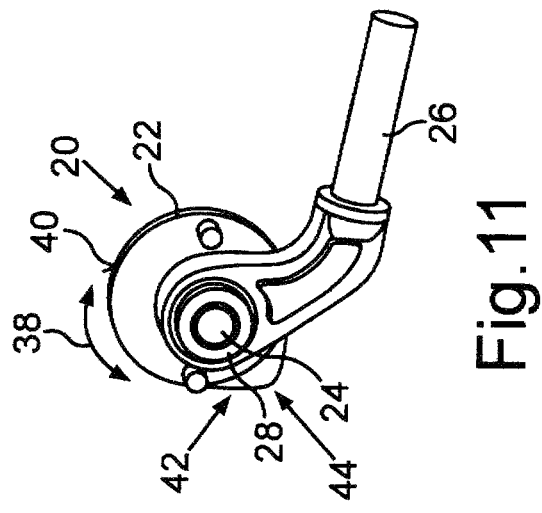
FIG. 11 is a schematic and perspective rear view of the valve according to FIG. 10.

FIGS. 10 and 11 show another alternative exemplary embodiment of the valve 20, wherein the projection 42 is a narrower in the circumferential direction in contrast to the projection 42 according to FIGS. 8 and 9 and thus has a more distinctly pointed tip 44. In addition, the projection 42 has a different orientation relative to the lever arm 26, in the circumferential direction.

FIGS. 12 and 13 show another alternative exemplary embodiment of the valve 20 with the valve disk 22 which forms the valve face 32. Therein, the valve face 32 does no longer comprise a projection which extends in the radial direction from the base body which is essentially circular in the circumferential direction. Rather, the valve face 32 comprises a projection 48 which extends in the axial direction (directional arrow 46), has an open cross-section and is at least partially arc-shaped. In other words, the valve face 32 is provided with the projection 48 extending in the axial direction. Thereby, the noise which is due in particular to self-excitation is reduced and/or transferred or shifted, respectively, into non-audible frequency ranges. The valve disk 22 or the valve face 32, respectively, has the at least essentially circular outer contour 40.

FIGS. 14 and 15 show an alternative exemplary embodiment of the valve means 20 according to FIGS. 12 and 13. In the exemplary embodiment of the valve means shown in FIGS. 12 and 13, the projection 48 is formed relative to the lever arm 26 in a direction opposite to that shown in the exemplary embodiment in FIGS. 14 and FIG. 15. While the projection 48 in the exemplary embodiment of FIGS. 12 and 13 is formed in an area of the valve face 32 opposite the lever arm 26, the projection 48 in the exemplary embodiment of FIGS. 14 and 15 is formed in an area of the valve face 32 near the lever arm 26. The valve face 32 according to FIGS. 14 and 15 comprises an at least essentially arc-shaped projection 48 extending in the axial direction (directional arrow 46), with the projection 48 being formed as an open semi-circle or semi-circle segment, respectively, in order to avoid, reduce and/or transfer the unpleasant noise into non-audible frequency ranges.

What is claimed is:

1. A bleed valve (20) of an exhaust gas turbocharger (10), comprising:
    a valve seat (34) with a valve disk (22) pivotally supported by a pivot arm (26) for controlling the flow cross-section of a bypass duct (18) of the exhaust gas turbocharger (10), for exhaust gas by-passing a turbine wheel of the exhaust gas turbocharger (10),
    the valve disk (22) having a front face (32) for engagement with the valve seat (34),
    the valve disk (22), over a main part of a circumference thereof, being circularly symmetric but having an asymmetric valve disk area (42),
    the valve front face (32) having an axis of symmetry with respect to the main circular symmetric part along which axis the valve disk (22) is attached to the pivot arm (26) with play and
    the asymmetric valve disk area (42) being formed symmetric with respect to a radial line extending through the axis of the main circular symmetric part of the valve disk (22) and the asymmetric area in which the contour of the disk deviates from the otherwise circular contour of the valve disk being in the form of a radial arc-shaped extension of the valve disk (22).

2. A bleed valve (20) of an exhaust gas turbocharger (10) according to claim 1, wherein
    the valve front face (32) is provided with a projection projecting from the front face (32) of the valve disk (22) at an off-center location of the front face (32) of the valve disk (22).

* * * * *